United States Patent
Chen et al.

(10) Patent No.: US 9,761,135 B2
(45) Date of Patent: Sep. 12, 2017

(54) METHOD AND SYSTEM FOR INTEGRATING MULTIPLE CAMERA IMAGES TO TRACK A VEHICLE

(75) Inventors: Yi-Yuan Chen, Taoyuan County (TW); Jian-Ren Chen, Hsinchu (TW); Leii H. Chang, Hsinchu County (TW); Shang-Chih Hung, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 492 days.

(21) Appl. No.: 13/585,795

(22) Filed: Aug. 14, 2012

(65) Prior Publication Data

US 2013/0307979 A1    Nov. 21, 2013

(30) Foreign Application Priority Data

May 15, 2012   (TW) .............................. 101117247 A (51) Int. Cl.
| | | |
|---|---|---|
| H04N 7/18 | (2006.01) | |
| G08G 1/017 | (2006.01) | |
| B60R 25/30 | (2013.01) | |
| G06K 9/00 | (2006.01) | |

(52) U.S. Cl.
CPC ......... G08G 1/0175 (2013.01); B60R 25/305 (2013.01); G06K 9/00785 (2013.01)

(58) Field of Classification Search
CPC ..... B60R 1/00; H04N 7/181; G08B 13/19602
USPC ........ 348/143, 148, 153, 159; 382/103, 104, 382/105
See application file for complete search history.

(56) References Cited

U.S. PATENT DOCUMENTS

| | | | |
|---|---|---|---|
| 5,568,406 A | 10/1996 | Gerber | |
| 7,046,169 B2 | 5/2006 | Bucholz et al. | |
| 7,439,847 B2 * | 10/2008 | Pederson ........... | G07C 9/00158 340/5.81 |

(Continued)

FOREIGN PATENT DOCUMENTS

| | | |
|---|---|---|
| CN | 101458833 | 6/2009 |
| CN | 101673467 | 3/2010 |

(Continued)

OTHER PUBLICATIONS

Yu et al., "The Design of the Embedded Wireless Vehicles Monitoring Management System Based on GPRS: Evidence from China," International Symposium on Intelligent Information Technology Application Workshops, 2008, pp. 677-680.

(Continued)

*Primary Examiner* — Michael Lee
*Assistant Examiner* — Omer Khalid
(74) *Attorney, Agent, or Firm* — Jianq Chyun IP Office (57) ABSTRACT

A method and a system for integrating multiple camera images to track a vehicle are provided. In the method, a security request of a vehicle to be tracked is received from a user, in which the security request comprises registration information and position information of the vehicle. Next, images captured by multiple cameras in a specific range around a location of the position information are retrieved. The retrieved images are analyzed according to the registration information, so as to recognize the images comprising the vehicle. Finally, a message is issued when the images comprising the vehicle are recognized.

18 Claims, 6 Drawing Sheets

(56) References Cited

U.S. PATENT DOCUMENTS

| | | |
|---|---|---|
| 7,587,276 B2 | 9/2009 | Gold et al. |
| 2004/0201460 A1 | 10/2004 | Bucholz et al. |
| 2011/0025851 A1 | 2/2011 | Rumble |
| 2013/0243260 A1* | 9/2013 | Burry ................ G06Q 30/0202 382/105 |
| 2013/0259314 A1* | 10/2013 | Kozitsky ............. G06K 9/3258 382/105 |

FOREIGN PATENT DOCUMENTS

| | | |
|---|---|---|
| JP | 2008070978 | 3/2008 |
| TW | 200406720 | 5/2004 |
| TW | 201135680 | 10/2011 |
| WO | 2007027074 | 3/2007 |

OTHER PUBLICATIONS

Lee et al., "Multi-sensor Information Integration on DSP Platform for Vehicle Navigation Safety and Driving Aid," Proceedings of the 2009 IEEE International Conference on Networking, Sensing and Control, Mar. 2009, pp. 653-658.
Moloo et al., "Low-Cost Mobile GPS Tracking Solution," 2011 International Conference on Business Computing and Global Informatization, Dec. 11, 2011, pp. 516-519.
Ganesh et al., "Anti-Theft Tracking System for Automobiles," IEEE International Conference on Anti-Counterfeiting, Security and Identification, Dec. 11, 2011, pp. 17-19.
"Office Action of Taiwan Counterpart Application", dated Feb. 12, 2014, p. 1-p. 4.
"Office Action of China Counterpart Application", dated Apr. 27, 2015, p. 1-p. 8.

* cited by examiner

| suspected location of the vehicle | $P_1$ | $P_2$ | $P_3$ | $P_4$ |
|---|---|---|---|---|
| $P_1$ |  | 1 | 0 | 1 |
| $P_2$ | 1 |  | 0 | 1 |
| $P_3$ | 0 | 0 |  | 1 |
| $P_4$ | 1 | 1 | 1 |  |

FIG. 6a

| n | C | $\frac{C}{n^2-n}$ | $\hat{N}$ |
|---|---|---|---|
| 0 | — | — | 5 |
| 1 | — | — | 5 |
| 2 | 2 | 2/2>0.5 | 5−1=4 |
| 3 | 2 | 2/6<0.5 | 4+1=5 |
| 4 | 8 | 8/12>0.5 | 5−1=4 |

METHOD AND SYSTEM FOR INTEGRATING MULTIPLE CAMERA IMAGES TO TRACK A VEHICLE

CROSS-REFERENCE TO RELATED APPLICATION

This application claims the priority benefit of Taiwan application serial No. 101117247, filed on May 15, 2012. The entirety of the above-mentioned patent application is hereby incorporated by reference herein and made a part of this specification.

TECHNICAL FIELD

The disclosure relates to a method and system for integrating multiple camera images to track a vehicle.

BACKGROUND

In recent years, vehicle theft cases have increased. In Taiwan, hundreds of vehicles are stolen everyday. To prevent vehicles from being stolen, a most effective strategy is to instantly detect the stealing behavior, immediately inform the vehicle owner and simultaneously track the location of the vehicle. Accordingly, the theft rate can be reduced up to 60% according to a research.

In current vehicle anti-theft systems, satellite positioning and personnel monitoring are combined to assist vehicle owners in monitoring their vehicle's tracks around the clock. However, there are still a lot of deficiencies existed in the those systems. First, the vehicle owners have to pay for the anti-theft device or the security service. Second, since the vehicle anti-theft mechanism is triggered by an anti-theft sensor disposed in the vehicle, if the sensitivity of the sensor is low, the anti-theft system may not be triggered at the time the vehicle is stolen. Or, if the communication quality is poor at the location of the vehicle (e.g., in the basement), both the monitoring center and the vehicle owner would not receive the alarm triggered by the anti-theft system.

On the other hand, if the sensitivity of the anti-theft sensor is high or the anti-theft sensor is malfunctioned, a false alarm rate (FAR) will probably be increased, which may cause the vehicle owner a lot of unnecessary inconveniences. Consequently, there is a need to provide a vehicle tracking method capable of increasing the accuracy of event detection and simultaneously reducing the false alarm rate.

SUMMARY OF THE DISCLOSURE

The disclosure provides a method and system for integrating multiple camera images to track a vehicle capable of increasing the accuracy of vehicle tracking and reducing the false alarm rate.

The disclosure provides a method for integrating multiple camera images to track a vehicle, adapted to a server tracking the vehicle by using images captured by a plurality of cameras. In the method, a security request (take the security as an example) of the vehicle is received from a user, wherein the security request includes registration information and position information of the vehicle. Next, a plurality of images captured by a plurality of cameras in a specific range around a location of the position information are retrieved. Then, the retrieved images are analyzed according to the registration information, so as to recognize images comprising the vehicle. Finally, a message is issued when a number of cameras having a recognized plate number the same as the plate number of the vehicle to be tracked reaches a threshold value.

The disclosure further provides a system for integrating multiple camera images to track a vehicle which includes a request processing unit, a data storage unit, an image capturing unit, an image processing unit and an analyzing unit. The request processing unit is used for receiving a security request of a vehicle to be tracked from a user, wherein the security request includes registration information and position information of the vehicle. The data storage unit is used for storing the registration information and the position information of the vehicle. The image capturing unit is used for retrieving a plurality of images captured by a plurality of cameras in a specific range around a location of the position information. The image processing unit is used for performing an image processing on the images. The analyzing unit is used for analyzing the retrieved images according to the registration information recorded in the security request by using a spatial and temporal data fusion analysis, wherein when the analyzing unit determines a number of cameras having a recognized plate number the same as the plate number of the vehicle to be tracked is equal to or greater than a threshold value, the request processing unit issues a message.

In light of the above, the method and system for integrating multiple camera images to track a vehicle of the disclosure retrieve and analyze the images captured by the cameras around the vehicle according to the vehicle information provided by the user. When the quantity of the vehicle being found in different cameras is equal to or greater than a recognition frequency threshold value, a message is instantly issued to the user, so that the accuracy of vehicle tracking can be improved and the false alarm rate can be reduced.

In order to make the disclosure more comprehensible, embodiments accompanying figures are described in detail below.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

FIG. 5a to FIG. 5c are examples of a spatial-temporal data fusion method of multiple cameras according to an exemplary embodiment of the disclosure.

DESCRIPTION OF EMBODIMENTS

The disclosure performs data analysis on the images captured by the monitoring cameras around a location of the vehicle according to vehicle information set by the user device, in which the data analysis includes moving object detection, license plate detection and plate number recognition. Then, a spatial-temporal data fusion method is applied to remove unreasonable moving vehicle tracking data, and a track is rebuilt according to the correlation between time and space. If the vehicle to be tracked is detected by nearby cameras during the security time, it represents that the vehicle has been stolen. At that time, the server at the service end instantly sends several key patterns (KP) of the vehicle captured by the monitoring cameras and a text message to the user device through a network. Accordingly, the user may see the moving trace of the vehicle and the key patterns in user device, so as to determine whether the vehicle has been stolen or not.

Figure 1:
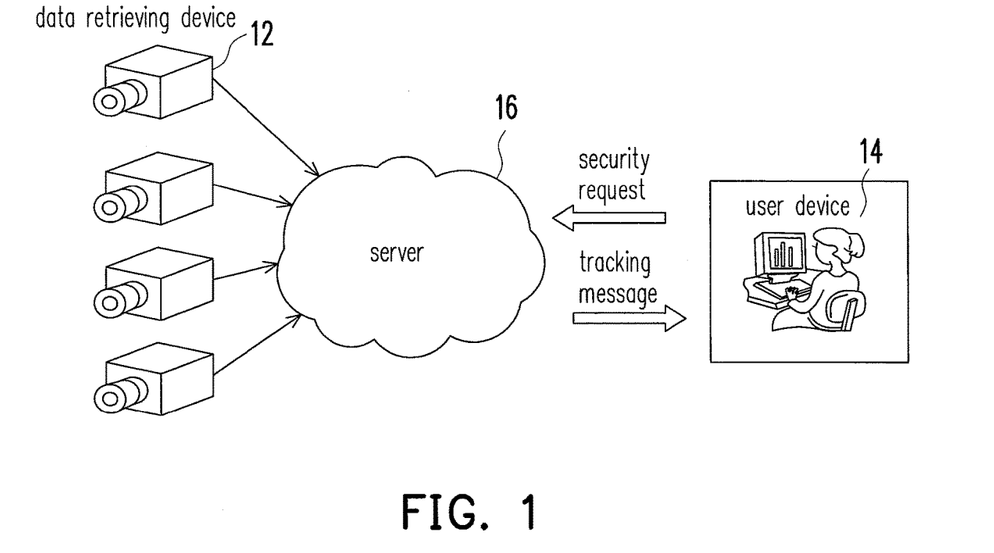
FIG. 1 is a schematic diagram of a system for integrating multiple camera images to track a vehicle according to an exemplary embodiment of the disclosure.

FIG. 1 is a schematic diagram of a system for integrating multiple camera images to track a vehicle according to an exemplary embodiment of the disclosure. Referring to FIG. 1, the vehicle tracking system may include three parts, that are, a data retrieving device 12, a user device 14 and a server 16.

The data retrieving device 12 uses cameras to capture images or videos and transmits the same to the server 16 through a communication network for further analysis.

The user device 14 may be any device capable of connecting with the network, such as a personal computer, a tablet computer, and a mobile device, and is used for connecting with the server 16 so as to send a security request to the server 16. The user may set his/her basic information (e.g., user name, password, or plate number), set/remove a tracking function, set an alert rule and confirm the issuing of a vehicle tracking message in the user device 14. Through the display of the received tracking message, the user may see the related information of the vehicle, such as moving path, key pattern (KP) or text message.

The server 16 may be any apparatus capable of computing, storing and communicating. First, this server is used for obtaining images or videos to be recognized from the data retrieving device 12 through a wired or a wireless transmission method. Next, various methods including moving object detection, license plate detection and plate number recognition are used to perform image processing on the obtained images, so as to obtain a preliminary recognition data. Then, multi-camera plate number comparison and alert rule comparison are further executed through data analysis and comparison. Finally, the related information such as the recognized key pattern and the trace may be sent to the user device 14. In addition, the server 16 has an extra database for storing the alert rule and the related information of the vehicle to be tracked set by the user.

Figure 2:
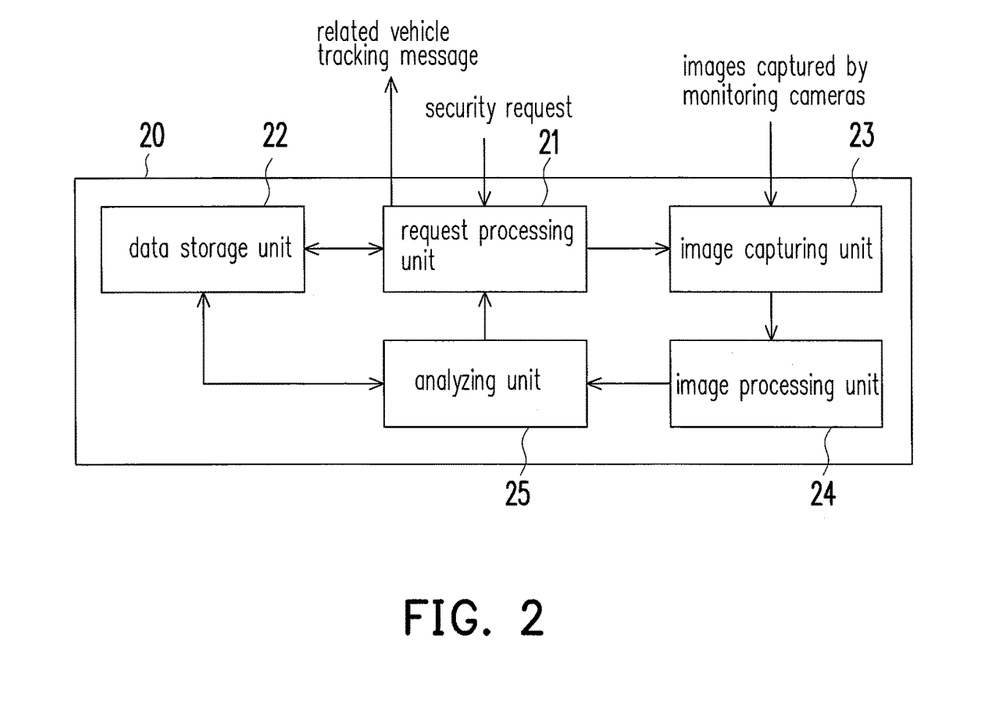
FIG. 2 is a block diagram of a system for integrating multiple camera images to track a vehicle according to an exemplary embodiment of the disclosure.
Figure 3:
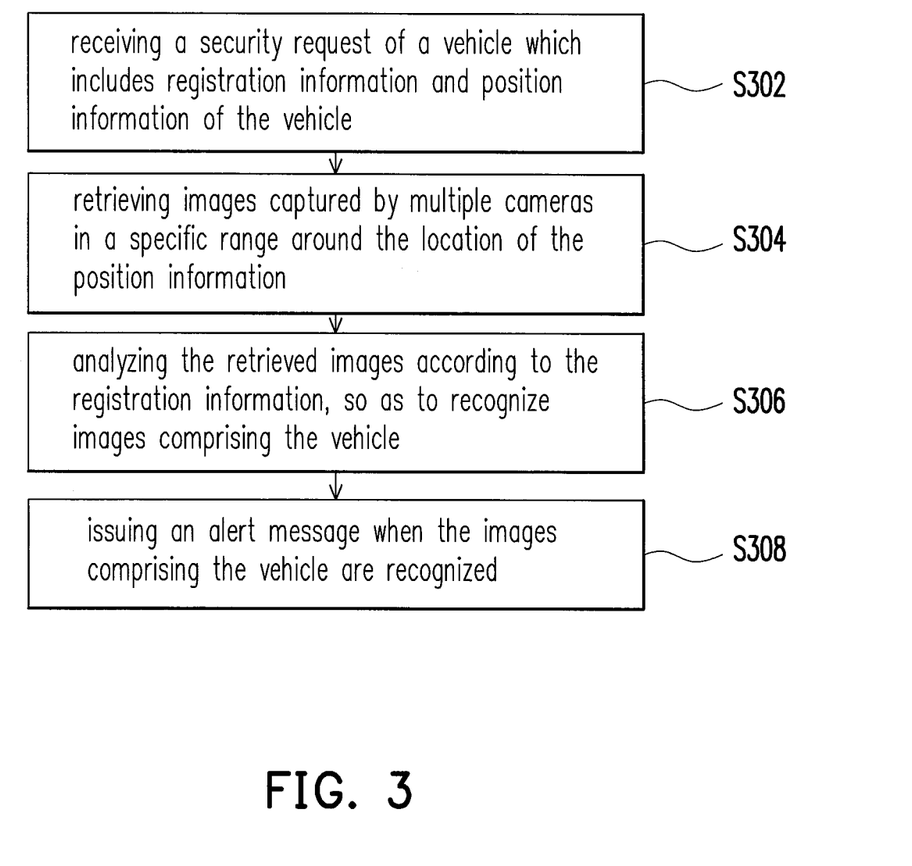
FIG. 3 is a flowchart of a method for integrating multiple camera images to track a vehicle according to an exemplary embodiment of the disclosure.

Specifically, FIG. 2 is a block diagram of a system for integrating multiple camera images to track a vehicle according to an exemplary embodiment of the disclosure. FIG. 3 is a flowchart of a method for integrating multiple camera images to track the vehicle according to an exemplary embodiment of the disclosure. Referring to FIG. 2 and FIG. 3 together, the vehicle tracking system 20 includes a request processing unit 21, a data storage unit 22, an image capturing unit 23, an image processing unit 24 and an analyzing unit 25. The detailed steps of the vehicle tracking method of the embodiment of the disclosure are described accompanying with the components of the vehicle tracking system 20 in FIG. 2.

First, a security request of a vehicle to be tracked set by a user device is received by the request processing unit 21, wherein the security request includes registration information and position information of the vehicle (step S302). The user device is, for example, a personal computer, a tablet computer, or a mobile device and the aforesaid security request is set or generated by the user activating a security or activating a general setting or request function in the user device, for example. In an exemplary embodiment, the user may use a home computer to directly connect with the vehicle tracking system 20 at the service end via the internet, so as to set the current position information of the vehicle to be tracked, such as street name, address, landmark, and longitude and latitude coordinates. In another exemplary embodiment, the user may use a carry-on mobile device to position the vehicle inside the vehicle or by the side of the vehicle to obtain the position information of the vehicle, and provide the position information to the vehicle tracking system 20.

In addition, if the user has registered his/her basic information in the vehicle tracking system 20 before, the information, such as the account number, password, or plate number, may be automatically filled in the security request as the registration information of the vehicle. The vehicle tracking system 20 may send the related information to the user device according to this information. In another exemplary embodiment, the user may also set an alert rule and the registration information of the vehicle in the security request, so that the vehicle tracking system 20 may send the tracking message according to the alert rule and the registration information when the images comprising the vehicle are recognized. The user may directly set the plate number of the vehicle to be tracked in the security request as the registration information of the vehicle. Additionally, the alert rule set by the user device is, for example, the activating and removing time period of the security, the specific region, the quantity of key pattern being generated, and the moving distance of the vehicle. For instance, when one or a combination of the rules, such as being in a specific time period, being moved beyond a specific region, the moving distance of the vehicle reaching a specific distance, the quantity of key pattern reaching a predetermined value, are satisfied, the vehicle tracking system 20 sends the related information of the vehicle to the user device 14. After the user completes the setting, the user device may transmit the information, such as aforementioned position information, registration information, or alert rule, and the request message for activating the security to the vehicle tracking system 20, so as to be stored in a security database of the data storage unit 22 of the vehicle tracking system 20.

During processing the security request, the vehicle tracking system 20 may use the image capturing unit 23 for retrieving a plurality of images captured by a plurality of cameras in a specific range around a location of the position information of the vehicle (step S304). The specific range is, for example, a range within 300 or 500 meters from the location of the vehicle. The image capturing unit 23 may search for the cameras located within the specific range according to the disposition information of the cameras, and retrieve the captured images for the use of vehicle security. Furthermore, the specific range can also be set as multi-layer ranges for vehicle tracking, such as 300 meters as the first layer, 700 meters as the second layer, and 1000 meters as the third layer, etc.

Accordingly, images required to be analyzed by the vehicle tracking system 20 may be restricted to the images around the vehicle, thus the calculation cost for tracking the vehicle may be effectively reduced. Then, the image processing unit 24 may execute the image processing on the images retrieved by the image capturing unit 23, so as to recognize the license plates in the images. The image processing includes one of the moving object detection, license plate detection, plate number recognition, or a combination thereof. Specifically, the image processing unit 24 may calculate the position of the license plate in the image by using technologies such as object tracking, edge detection or statistical analysis, and perform the license plate detection and the plate number recognition by using character recognition technology, such as character detection, character segmentation, character classifier, or feature comparison.

The analyzing unit 25 may analyze the images processed by the image processing unit 24 according to the registration information of the vehicle set in the security request, so as to recognize the images comprising the vehicle to be tracked (step S306). In detail, the analyzing unit 25 may compare the license plates recognized by the image processing unit 24 with the license plate corresponding to the registration information, so as to find out the images comprising the vehicle and being consistent with the registered license plate.

Figure 4:
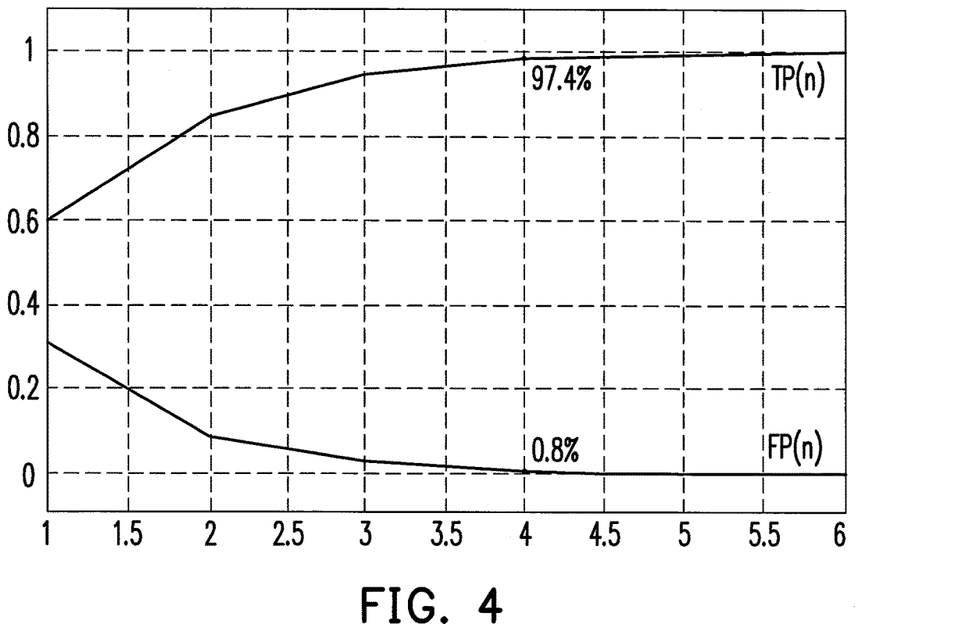
FIG. 4 is a diagram illustrating a curve of recognition rate of multiple cameras according to an exemplary embodiment of the disclosure.

It is noted that since there are still misjudgements on recognition of the image processing unit 24, the analyzing unit 25 may execute a spatial-temporal data fusion method, so as to enhance the alert accuracy and reduce the false alarm rate, and details thereof are described in the following. It is assumed that the statistical value of the true positive rate (TPR) of the license plate recognition of each of the cameras is 60%, and the false positive rate (FPR) is 30%. As shown in FIG. 4, TP(n) represents the TPR of the same vehicle being recognized as the same plate number by n cameras, and FP(n) represents the FPR of the same vehicle being recognized as different plate numbers by n cameras. It can be significantly seen by referring the variation of TP(n) and FP(n) curves that the TPR of the license plate can be improved through the license plate recognition by multi-cameras, and the false alarm rate of the system can also be effectively reduced. For example, TP(4)=97.4% (i.e. 1−(1−0.6)4). Therefore, the method may set a recognition frequency threshold value according to a historical statistic value of license plate recognition accuracy. That is, the analyzing unit 25 may set an expected value of recognition as, for example, 97%. According to FIG. 4, when n=4, the vale of TP(4) is equal to 97.4%, which is greater than the expected value 97%. Therefore, it can be estimated that the vehicle has to be recognized by at least four different cameras such that the recognition accuracy thereof can achieve the expected value 97% and the recognition frequency threshold value can be set as 4. Afterward, the analyzing unit 25 may dynamically adjust the recognition frequency threshold value by referring to the information, such as actual driving time, distance and speed. If the number of times that the license plate is recognized by different cameras is equal to or greater than the recognition frequency threshold value, the analyzing unit 25 may notify the request processing unit 21 to send the tracking message and the alert signal. The above mentioned numbers may vary under different use conditions, but do not affect the implementation of the disclosure.

Figure 5A:
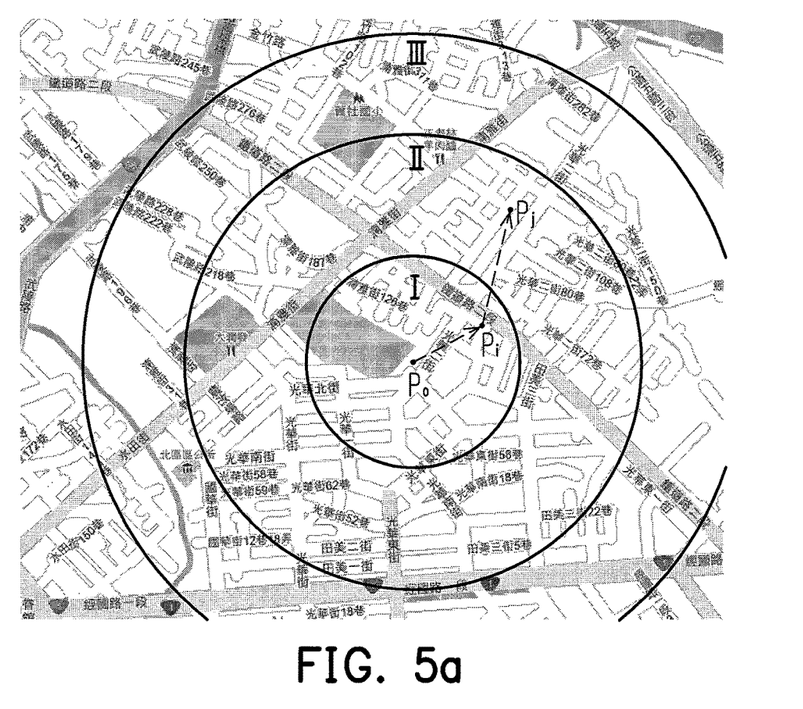
Figure 5B:
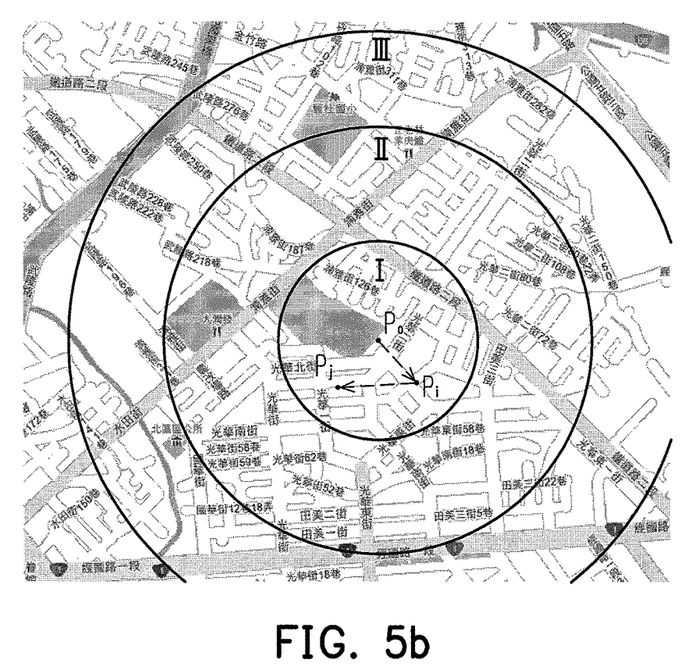
Figure 5C:
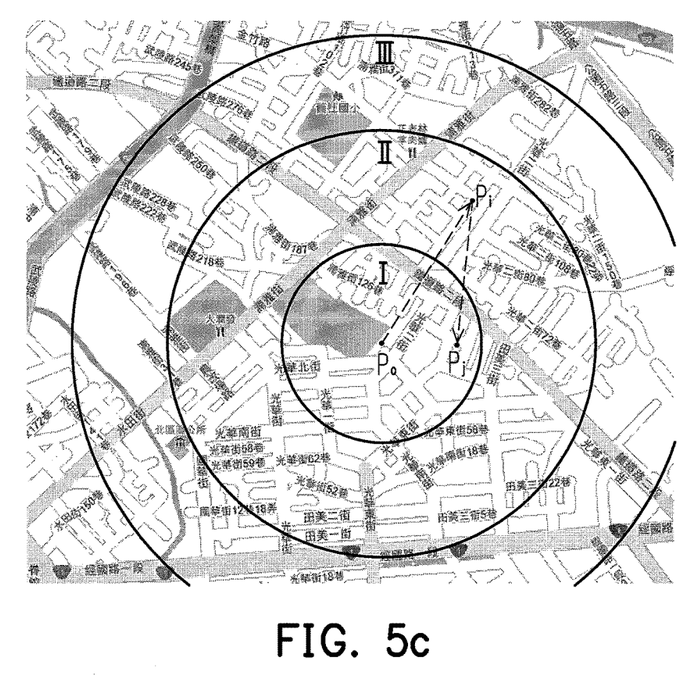

As shown in FIG. 5a, if a license plate not belonging to the secured vehicle is recognized as the license plate of the secured vehicle, it may cause wrong statistics of value n. In order to resolve such problem, an analysis and comparison on the correlation between time and space is adopted and the recognition frequency threshold value N is dynamically increased or reduced. For instance, $P_0$ is assumed to be the initial coordinates set by the secured vehicle, and $P_i$ and $P_j$ ($i \neq j$) represent the disposition locations or the field of view (FOV) locations of the camera corresponding to the secured plate number recognized by the image processing unit 24 at time points $T_i$ and $T_j$, respectively, wherein $T_i < T_j$. Herein, $\Delta T_{i,j} = T_j - T_i$, which represents the time difference between the time points $T_i$ and $T_j$. $S_{i,j}$ represents an average velocity of the appearance location of the recognized secured vehicle moving from $P_i$ to $P_j$, in which the distance of the moving path of from $P_i$ to $P_j$ may be obtained from the map information. $D_i$ represents the distance between $P_0$ and $P_i$, and $D_j$ represents the distance between $P_0$ and $P_j$. When receiving the security request message, the vehicle tracking system 20 may refer to the initial coordinates $P_0$ set by the secured vehicle, take $P_0$ as an center and take a particular distance from the center $P_0$ as a radius, so as to plan a plurality of monitoring regions, such as the first region I, the second region II and the third region III. If the value $D_j$ of the secured plate number being recognized is much greater than the value $D_i$ and the appearance location is moved from $P_i$ to $P_j$, that is, the appearance region of the vehicle moves from the first region I to the second region II, it represents that the two license plate recognition results may probably be the same secured vehicle and the recognition frequency threshold value N can remain unchanged. As shown in FIG. 5b, if the value $D_j$ of the secured vehicle being recognized is close to the value $D_i$ and the appearance locations from $P_i$ to $P_j$ are in the same region, that is, the appearance region of the vehicle is moved from the first region I to the first region I, it represents that the two license plate recognition results may probably be the same secured vehicle, thus the recognition frequency threshold value N can remain unchanged. As shown in FIG. 5c, if the value $D_j$ of the secured vehicle being recognized is much smaller than the value $D_i$ and the appearance location is moved from $P_i$ to $P_j$, that is, the appearance region of the vehicle is moved from the second region II to the first region I, it represents that the probability that the two license plate recognition results are the same secured vehicle is not high. According to a general principle, the possibility of driving from $P_0$ to $P_j$ is much higher than the possibility of making a contour to $P_i$ from $P_0$ and then back to $P_j$. Accordingly, the analyzing unit 25 has to increase the threshold value N, so as to reduce the false alarm rate. In addition, the value of $\Delta T_{i,j}$ may also be compared with an average $\overline{\Delta T}_{i,j}$ of historical statistics. For example, as the $\Delta T_{i,j}$ is closer to $\overline{\Delta T}_{i,j}$, it represents that the two license plate recognition results may probably be the same secured vehicle, and the recognition frequency threshold value N can remain unchanged. On the contrary, as the difference between $\Delta T_{i,j}$, and $\overline{\Delta T}_{i,j}$ is getting large, it represents the probability that the two license plate recognition results are the same secured vehicle is low, and the analyzing unit 25 may increase the recognition frequency threshold value N, so as to reduce the false alarm rate.

In the above mentioned comparison method of $\Delta T_{i,j}$ and $\overline{\Delta T}_{i,j}$, the probability distribution (e.g. normal or gamma distribution) of $\Delta T_{i,j}$ may be estimated in advance according to the historical statistics. Then, a confidence interval is set. Taking the normal distribution as an example, 95% of the confidence interval is about within a range of [average−2 times standard deviation, average+2 times standard deviation]. Therefore, if $\Delta T_{i,j}$ is within the confidence interval, it represents that the two license plate recognition results have a great possibility to be the same secured vehicle. On the contrary, if $\Delta T_{i,j}$ is beyond the confidence interval, the probability that the two license plate recognition results are the same secured vehicle is low, thus the analyzing unit 25 may increase the recognition frequency threshold value N, so as to reduce the false alarm rate. Similarly, the probability distribution of an average speed may be estimated in advance according to the historical statistics, and an average speed $S_{i,j}$ moving from $P_i$ to $P_j$ is determined whether to be within a confidence interval. If the average speed $S_{i,j}$ is within the confidence interval, it represents that the two license plate recognition results may probably be the same secured vehicle. Otherwise, the probability is not high.

Figure 6A:
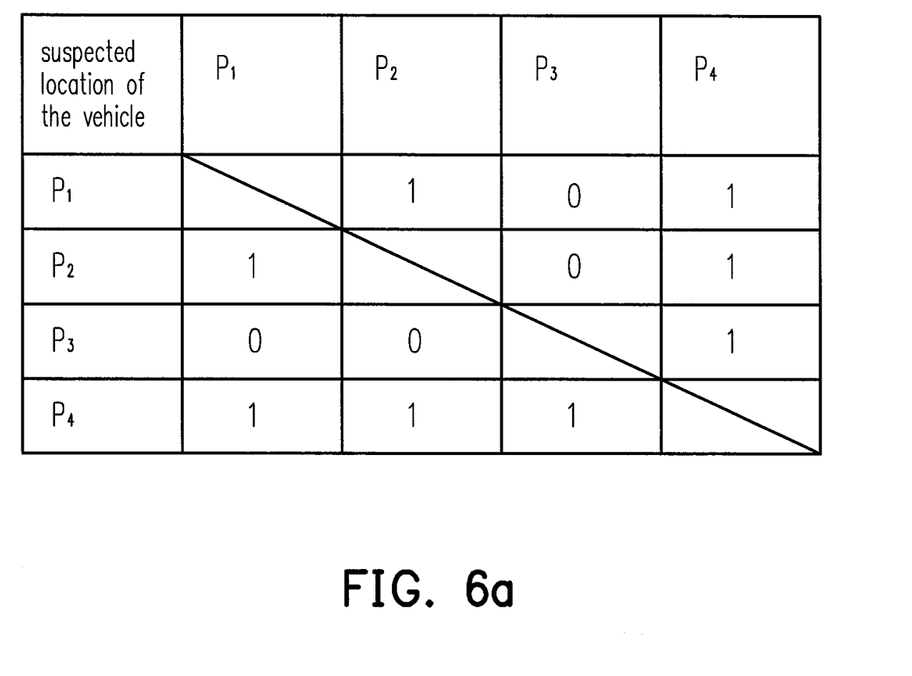
FIG. 6a shows results of the spatial-temporal data fusion method of multiple cameras according to an exemplary embodiment of the disclosure.
Figure 6B:
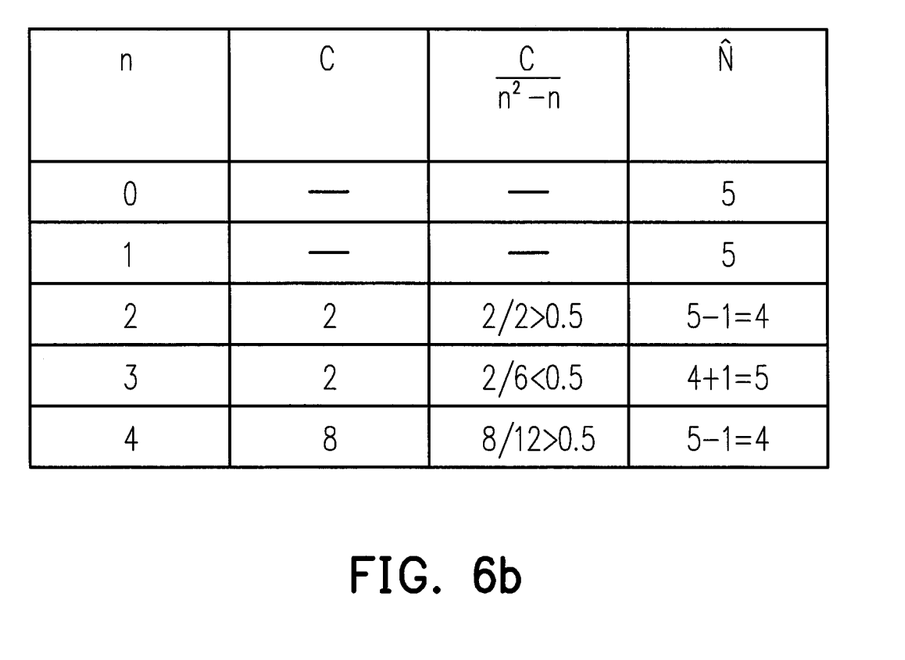
FIG. 6b shows examples of dynamically adjust the recognition frequency threshold value used for the spatial-temporal data fusion method according to an exemplary embodiment of the disclosure.

As illustrated above, $\Delta T_{i,j}$ and $\overline{\Delta T}_{i,j}$ are taken as an example, in which a threshold $\theta_t$ may be used to determine an approximate level between $\Delta T_{i,j}$ and $\overline{\Delta T}_{i,j}$. First, $\Delta T$ is set as the approximate level between $\Delta T_{i,j}$ and $\overline{\Delta T}_{i,j}$, which can be mathematically denoted as $\Delta T=|\Delta T_{i,j}-\overline{\Delta T}_{i,j}|$, and the comparison results thereof are sorted as shown in FIG. 6a. If the similarity between $\Delta T_{i,j}$ and $\overline{\Delta T}_{i,j}$ is large, i.e., $\Delta T \leq \theta_t$, the reliance value is represented as 1. If the similarity between $\Delta T_{i,j}$ and $\overline{\Delta T}_{i,j}$ is small, i.e., $\Delta T > \theta_t$, the reliance value is represented as 0. The total number of "1" and "0" is $n^2-n$ (wherein n≥2). It is assumed that C represents the number of "1", and $$\frac{C}{n^2-n}$$

represents the ratio of the number of "1" to the total number of "1" and "0". If the value of $$\frac{C}{n^2-n}$$

is greater than a certain value (e.g. 0.5), it represents that the reliability of the recognition results of n cameras are referred to the same secured vehicle is high from actually obtained information results. Therefore, the recognition frequency threshold value can be subtracted by 1, so as to increase a response speed of the alarm. Otherwise, the recognition frequency threshold value is added by 1, so as to reduce the false alarm rate. Assuming that the threshold value $\hat{N}$ of the initial recognition frequency is set to be 5, and referring to FIG. 6a and FIG. 6b, the value of n is from 0 to 4. When n is equal to 2, only values of P1 and P2 in FIG. 6a can be corresponded to, and the value of C is calculated as 2 and the value of $C/(n^2-n)$ is calculated as 1, which is greater than a preset value 0.5. Accordingly, the recognition frequency threshold value is subtracted by 1 to reach a value of 4. When n is equal to 3, the values of P1, P2 and P3 in FIG. 6a can be corresponded to. The value of C is calculated as 2, and the value of $C/(n^2-n)$ is calculated as 0.33, which is less than the preset value 0.5. Accordingly, the recognition frequency threshold value is added by 1 to reach a value of 5. When n is equal to 4, the values of P1, P2, P3 and P4 in FIG. 6a can be corresponded to. The value of C is calculated as 8, and the value of $C/(n^2-n)$ is calculated as 0.75, which is greater than the preset value 0.5. Accordingly, the recognition frequency threshold value is subtracted by 1 to reach a value of 4. Meanwhile, as n=4, which is equal to the recognition frequency threshold value, the analyzing unit 25 notifies the request processing unit 21 to send a tracking message and an alarm signal.

Besides the above mentioned embodiment, in which time is used for comparing the reliability of the recognition result obtained by multiple cameras, a moving distance of the vehicle can also be used for comparing the reliability. As shown in FIG. 5, normally the trace of the vehicle is moved from the first region I to the second region II, and then moved to the third region III. That is to say, the vehicle is moved toward an adjacent region. For instance, if a certain plate number is found in the monitoring region I and then found in the monitoring region III, during which the plate number is not found in the monitoring region II, since the probability that no camera in the monitoring region II recognizes the plate number is very low, the probability that the vehicles found in the monitoring regions I and III are the same is also very low. In the present embodiment, the monitoring regions are set up in a circular shape, and in other embodiments, they can be set up in any other shapes. As illustrated above, a moving distance of the vehicle between two adjacent time points $T_i$ and $T_j$ is calculated and determined whether to exceed a range, so as to determine the reliability that whether the recognition results of n cameras are the same secured vehicle. The difference of the distances between $D_j$ and $D_i$ during the adjacent time points $T_i$ and $T_j$ ($T_i < T_j$) is represented by $\Delta D_{j,i}$, which is mathematically denoted as $\Delta D_{j,i}=D_j-D_i$. For the sake of illustrating the embodiment, as shown in FIG. 5, it is assumed that the difference between the radii of the first region I and the second region II and the difference between the radii of the second region II and the third region III are the same, i.e., $\overline{\Delta R}=R_2-R_1=R_3-R_2$. The level of the value of $\Delta D_{j,i}$ close to the value of $\overline{\Delta R}$ is represented by $\Delta D$, which is mathematically denoted as $\Delta D=|\Delta D_{j,i}-\overline{\Delta R}|$. If a similarity between $\Delta D_{j,i}$ and $\overline{\Delta R}$ is large, i.e., $\Delta D \leq \theta_d$, it represents the probability that the two recognition results are the same secured vehicle is very high, and the reliance value is represented as 1. If the similarity between $\Delta D_{j,i}$ and $\overline{\Delta R}$ is small, i.e., $\Delta D > \theta_d$, then it represents the moving distance may cross more than at least one region, and the reliance value is represented as 0. Similarly, the reliance value may be obtained by determining whether the equation $\Delta S < \theta_s$ is true by using a method considering the speed, or by using a weighted method simultaneously considering various combinations such as time and distance, time and speed, distance and speed, and time and distance and speed.

In another embodiment, based on the above, multiple determining conditions such as time, distance, and speed can be simultaneously combined, and a general fuzzy inference method may be used to implement aforesaid method, in which the input information is, for example, $\Delta T$, $\Delta D$ and $\Delta S$ as illustrated above. The output result of the fuzzy inference is set to be $\lambda$, which represents the increment of the recognition frequency threshold value. Therefore, the new recognition frequency threshold value $\hat{N}^{new}$ is equal to the old recognition frequency threshold value $\hat{N}^{old}$ plus $\lambda$. Assuming that after the fuzzy inference process and the final defuzzification calculation, a result of $\lambda=0.8$ is obtained. For instance, if $\hat{N}^{old}$ is equal to 3, then $\hat{N}^{new}$ is equal to 3.8, and at this time if n is equal to 4 (4>3.8), the request processing unit 21 sends a tracking message and an alarm signal.

Back to the flow of FIG. 3, when the analyzing unit 25 determines that the images comprising the vehicle satisfy the alert rule, the request processing unit 21 issues a tracking message (step S308). In one exemplary embodiment, the tracking message may be an alarm message only including a text, so as to warn the user that the vehicle may be stolen. In another exemplary embodiment, the tracking message may include the recognized images comprising the vehicle to be tracked and the information such as the locations and time that the cameras capture the images, such that the user can ensure the recognized vehicle is his/her vehicle and also be aware of the moving path of the vehicle, so as to perform follow-up tracking.

Specifically, the tracking message is, for example, sent to the user device such that the user device can retrieve the locations of cameras capturing the images which are recorded in the tracking message, display a map nearby the locations, and mark the images of the vehicle to be tracked on the map.

Figure 7:
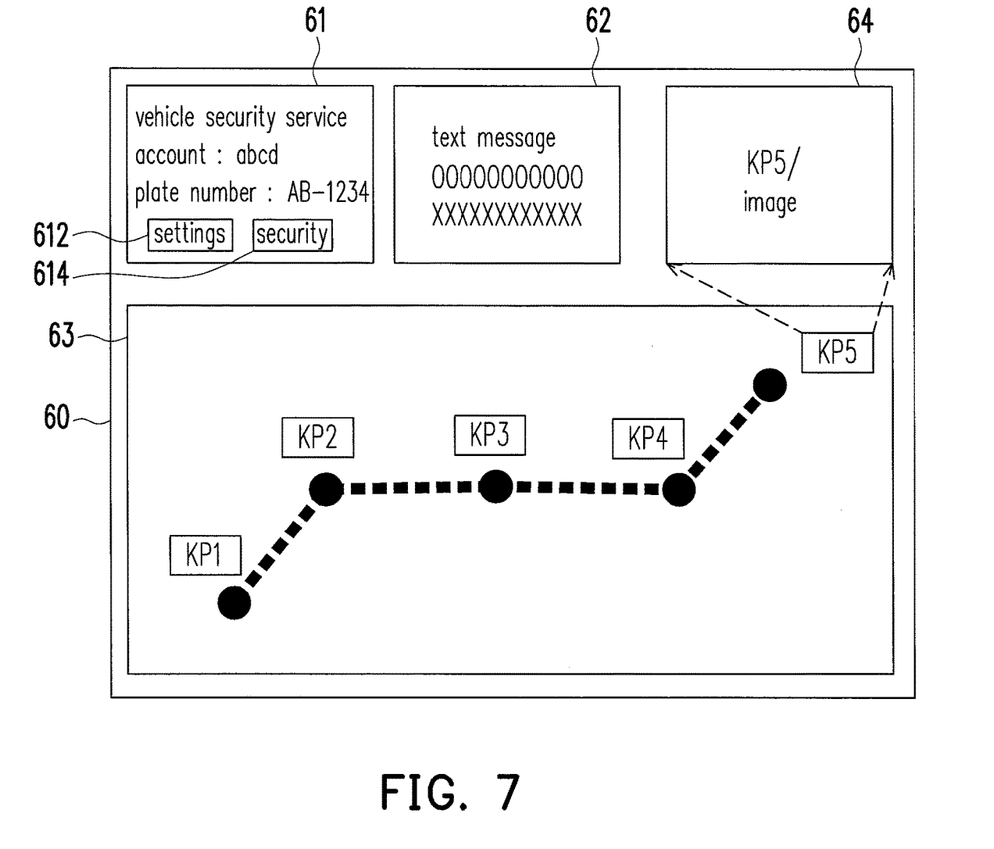
FIG. 7 is a schematic view of an operating interface of a vehicle tracking system according to an exemplary embodiment of the disclosure.

For instance, FIG. 7 is a schematic view of an operating interface of a vehicle tracking system according to an exemplary embodiment of the disclosure. Referring to FIG. 7, the operating interface 60 is, for example, the interface provided by the vehicle tracking system after the user uses the user device to connect to the vehicle tracking system. The operating interface 60 includes a security request setting region 61, a tracking message display region 62, a tracking path display region 63 and a segmental image display region 64, for example. In a first time of use, the user may set, modify and save his/her basic information and a current location of the vehicle to be tracked by pressing a setting key 612 in the security request setting region 61, or the user may use the user device to position the vehicle inside the vehicle or by the side of the vehicle to obtain the location information. The user may also set, modify and save his/her basic information, the location information of the vehicle to be tracked, or other information such as the alert rule by pressing the setting key 612. After all the settings of related information are completed, the user may press the security key 614 to send a security request to the vehicle tracking system so as to activate the vehicle tracking process. In another exemplary embodiment, the function of the setting key 612 may also include setting, modifying and saving the alert rule. After the user's first time of using the vehicle tracking system, if the user does not change the information, such as the basic information, or the alert rule, the user may directly press the security key 614 to send the security request to the vehicle tracking system.

When the vehicle tracking system detects vehicles having the same plate number appear in multiple cameras and a number of appearance times reaches the recognition frequency threshold value, the vehicle tracking system issues a tracking message back to the user device, so as to display an alarm message and information of the tracked vehicle, such as time, location, number of key pattern and moving distance in the tracking message display region 62. In addition, the user device may display the locations where the vehicle is tracked and the key patterns KP1 to KP5 captured at those locations in the tracking path display region 63, and connect those locations to obtain the tracking path of the vehicle. At this time, the user may select any one of the key patterns KP1 to KP5 to view an enlarged image of the key pattern or an video of the vehicle (e.g., key pattern KP5) recorded by the camera in the segmental image display region 64.

Furthermore, when the vehicle tracking system detects vehicles having the same plate number according to the locations of the cameras corresponding to the images comprising the vehicle, the vehicle tracking system may retrieve the images captured by other cameras within a specific range nearby the location of the cameras, so as to recognize the vehicle. Accordingly, the vehicle tracking system is able to keep tracking the moving path of the vehicle.

It should be noted that the aforementioned exemplary embodiments are used in vehicle anti-theft applications, but the same method may also be used in other vehicle tracking applications. For instance, when a passenger gets on a taxi, he/she may use a carry-on mobile device to position the taxi and send the plate number and the position information of the taxi to the vehicle tracking system of the disclosure. Accordingly, the vehicle tracking system retrieves the images of the cameras nearby the taxi so as to monitor the moving path of the taxi. The related monitoring data may be transmitted to the family of the passenger, so as to assist the family in checking whether the moving path of the taxi is normal or not. Accordingly, a purpose of ensuring passenger's safety is achieved. On the other hand, when the passenger gets on the taxi, the taxi driver may also use a mobile device to send a security request, such that through the vehicle tracking system monitoring the moving path, the taxi driver's safety may also be ensured.

In light of the foregoing, the method and system for integrating multiple camera images to track a vehicle of the disclosure performs spatial-temporal data fusion analysis on the images of multiple cameras located around the vehicle to be tracked, such that the accuracy of event detection can be increased and the false alarm rate can be reduced. Furthermore, no extra anti-theft sensor or other hardware is required to be disposed in the vehicle, and no extra communication monthly fee or call charge of the car device is required.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A method for integrating multiple camera images to track a vehicle, adapted to a server having a request processing unit, an image capturing unit, an image processing unit, and an analyzing unit, for tracking the vehicle by using images captured by a plurality of cameras, the method comprising:

receiving a request to track the vehicle by the request processing unit, wherein the request comprises a registration information and a position information of the vehicle;

retrieving a plurality of images captured by the plurality of cameras in a specific range around a location of the position information by the image capturing unit;

analyzing the retrieved images according to the registration information by the analyzing unit, so as to recognize the images comprising the vehicle, comprising:

performing an image processing on the images captured by each of the cameras by the image processing unit, so as to recognize at least one license plate from the images;

comparing the recognized at least one license plate with the license plate corresponding to the registration information by the image processing unit, so as to find out images having the license plate matched to serve as the images comprising the vehicle;

estimating a recognition frequency threshold value indicating a minimum quantity of cameras that recognize the license plate by the analyzing unit according to at least one historical statistic value, wherein each historical statistic value comprises a license plate recognition accuracy of recognizing the license plate by n cameras, wherein n is a positive integer;

calculating a quantity of cameras which capture the images comprising the vehicle by the analyzing unit; and issuing a message by the request processing unit when the calculated quantity of cameras is equal to or greater than the recognition frequency threshold value, wherein an expected value of expecting a same license plate to be recognized in the images captured by the cameras is set by the analyzing unit, and the recognition frequency threshold value is estimated according to the set expected value and the at least one historical statistic value by the analyzing unit.

2. The method for integrating multiple camera images to track a vehicle as claimed in claim 1, wherein before the step of receiving the request of the vehicle, the method further comprises:

activating a function and setting the position information of the vehicle by a user device; and incorporating the position information and the registration information of the vehicle into the request and transmitting the request to the server by the user device.

3. The method for integrating multiple camera images to track a vehicle as claimed in claim 2, wherein the step of activating the function and setting the position information of the vehicle by the user device comprises:

positioning the vehicle to obtain the position information by the user device.

4. The method for integrating multiple camera images to track a vehicle as claimed in claim 2, wherein the step of activating the function and setting the position information of the vehicle by the user device further comprises:

setting an alert rule and the registration information, wherein the server issues the message according to the alert rule and the registration information when the images comprising the vehicle are recognized.

5. The method for integrating multiple camera images to track a vehicle as claimed in claim 4, wherein the alert rule comprises time, location, frequency, distance or time interval for detecting the vehicle.

6. The method for integrating multiple camera images to track a vehicle as claimed in claim 1, wherein the image processing comprises moving object detection, license plate detection, or plate number recognition, or a combination thereof.

7. The method for integrating multiple camera images to track a vehicle as claimed in claim 1, wherein the step of analyzing the retrieved images according to the registration information, so as to recognize the images comprising the vehicle further comprises:

dynamically adjusting the recognition frequency threshold value by referring to a vehicle information, wherein the vehicle information comprises time, distance, or speed of driving, or a combination thereof.

8. The method for integrating multiple camera images to track a vehicle as claimed in claim 1, wherein when the images comprising the vehicle are recognized, the method further comprises:

according to a location of the camera corresponding to the images comprising the vehicle, capturing images captured by other cameras in the specific range around the location of the camera, so as to recognize the vehicle.

9. The method for integrating multiple camera images to track a vehicle as claimed in claim 1, wherein the message comprises the recognized images comprising the vehicle, or the locations and times of the cameras capturing the images, or a combination thereof.

10. The method for integrating multiple camera images to track a vehicle as claimed in claim 9, wherein the step of issuing the message comprises:

transmitting the message to a user device; and according to a location of the camera capturing the images recorded in the message, displaying a map around the location on the user device, and labeling the recognized images comprising the vehicle on the map.

11. A system for integrating multiple camera images to track a vehicle, comprising:

a request processing unit, configured to receive a request of a vehicle, wherein the request comprises a registration information and a position information of the vehicle;

a data storage unit, configured to store the registration information and the position information of the vehicle;

an image capturing unit, configured to retrieve a plurality of images captured by a plurality of cameras in a specific range around a location of the position information;

an image processing unit, configured to perform an image processing on the images; and an analyzing unit, configured to analyze the retrieved images according to the registration information, so as to recognize the images comprising the vehicle, wherein the request processing unit issues a message when the images comprising the vehicle are recognized, wherein the image processing unit performs an image processing on the images captured by each of the cameras, so as to recognize at least one license plate from the images, and compares the recognized at least one license plate with the license plate corresponding to the registration information, so as to find images having the license plate matched to serve as the images comprising the vehicle, wherein the analyzing unit further estimates a recognition frequency threshold value indicating a minimum quantity of cameras that recognize the license plate according to at least one historical statistic value, calculates a quantity of cameras which capture the images comprising the vehicle, and compares the quantity of cameras with the recognition frequency threshold value, wherein the request processing unit issues the message when the calculated quantity of cameras is equal to or greater than the recognition frequency threshold value, wherein each historical statistic value comprises a license plate recognition accuracy of recognizing the license plate by n cameras, wherein n is a positive integer, wherein an expected value of expecting a same license plate to be recognized in the images captured by the cameras is set by the analyzing unit, and the recognition frequency threshold value is estimated according to the set expected value and the at least one historical statistic value by the analyzing unit.

12. The system for integrating multiple camera images to track a vehicle as claimed in claim 11, wherein the request processing unit further provides a user device for setting the position information of the vehicle.

13. The system for integrating multiple camera images to track a vehicle as claimed in claim 11, wherein the request processing unit further provides a user device for setting an alert rule and the registration information, wherein the server issues the message according to the alert rule and the registration information when the images comprising the vehicle are recognized.

14. The system for integrating multiple camera images to track a vehicle as claimed in claim 13, wherein the alert rule comprises time, location, frequency, distance or time interval for detecting the vehicle.

15. The system for integrating multiple camera images to track a vehicle as claimed in claim 11, wherein the image processing comprises moving object detection, license plate detection, or plate number recognition, or a combination thereof.

16. The system for integrating multiple camera images to track a vehicle as claimed in claim 11, wherein the analyzing unit further dynamically adjusts the recognition frequency threshold value by referring to a vehicle information, wherein the vehicle information comprises time, distance, or speed of driving, or a combination thereof.

17. The system for integrating multiple camera images to track a vehicle as claimed in claim 11, wherein the request processing unit further captures images captured by other cameras in the specific range around the location of the camera according to a location of the camera corresponding to the images comprising the vehicle, so as to recognize the vehicle.

18. The system for integrating multiple camera images to track a vehicle as claimed in claim 11, wherein the message comprises the recognized images comprising the vehicle, or the locations and time of the cameras capturing the images, or a combination thereof.

* * * * *